United States Patent
Wamprecht et al.

(10) Patent No.: US 7,728,076 B2
(45) Date of Patent: *Jun. 1, 2010

(54) COATING COMPOSITIONS

(75) Inventors: Christian Wamprecht, Neuss (DE); Markus Mechtel, Bergisch Gladbach (DE); Thomas Klimmasch, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/983,850

(22) Filed: Nov. 13, 2007

(65) Prior Publication Data

US 2008/0146767 A1   Jun. 19, 2008

(30) Foreign Application Priority Data

Nov. 15, 2006   (DE)   .......... 10 2006 053 740

(51) Int. Cl.
  *C08L 75/06* (2006.01)
(52) U.S. Cl. .......... 525/131; 525/185; 525/190
(58) Field of Classification Search .......... 525/131
  See application file for complete search history.

(56) References Cited

U.S. PATENT DOCUMENTS

| | | | |
|---|---|---|---|
| 3,992,316 A | 11/1976 | Pedain et al. | |
| 3,996,223 A | 12/1976 | Gupta et al. | |
| 4,255,569 A | 3/1981 | Müller et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,064,960 A | 11/1991 | Pedain et al. | |
| 5,076,958 A | 12/1991 | Pedain et al. | |
| 5,733,973 A | 3/1998 | Wamprecht et al. | |
| 5,914,383 A | 6/1999 | Richter et al. | |
| 5,969,054 A | 10/1999 | Wamprecht et al. | |
| 6,048,936 A | 4/2000 | Epple et al. | |
| 6,380,308 B1 | 4/2002 | Wamprecht et al. | |
| 6,818,784 B2 | 11/2004 | Tillack et al. | |
| 6,887,937 B1 * | 5/2005 | Vandevoorde et al. | 525/131 |
| 7,060,778 B2 | 6/2006 | Hofacker et al. | |
| 7,196,134 B2 | 3/2007 | Wamprecht et al. | |
| 7,649,074 B2 | 1/2010 | Bruchmann et al. | |
| 2006/0281857 A1 | 12/2006 | Hofacker et al. | |
| 2008/0114133 A1 * | 5/2008 | Wamprecht et al. | 525/450 |

FOREIGN PATENT DOCUMENTS

| | | |
|---|---|---|
| DE | 1954093 | 6/1970 |
| DE | 1670666 | 7/1971 |
| DE | 2414413 | 10/1975 |
| DE | 2452532 | 5/1976 |
| DE | 2641380 | 3/1978 |
| DE | 3700209 | 7/1988 |
| DE | 3900053 | 7/1990 |
| DE | 3928503 | 3/1991 |
| DE | 19824118 | 12/1999 |
| DE | 10 2005 009 166 A1 | 8/2006 |
| EP | 336205 | 10/1989 |
| EP | 339396 | 11/1989 |
| EP | 778298 | 6/1997 |
| EP | 798299 | 10/1997 |
| EP | 819710 | 1/1998 |
| EP | 0896991 | 2/1999 |
| EP | 1101780 | 5/2001 |
| EP | 1404740 | 4/2004 |
| EP | 1 479 704 A2 | 11/2004 |
| EP | 1477508 | 11/2004 |
| EP | 1 731 582 A1 | 12/2006 |
| GB | 1145952 | 3/1969 |
| GB | 1244416 | 9/1971 |
| WO | WO-96/20968 | 7/1996 |

* cited by examiner

*Primary Examiner*—Randy Gulakowski
*Assistant Examiner*—Mike Dollinger
(74) *Attorney, Agent, or Firm*—Connollly Bove Lodge & Hutz LLP

(57) ABSTRACT

The present invention relates to novel coating compositions comprising polyisocyanates, aliphatic oligocarbonate polyols, oligoester polyols and polyacrylate polyols, to a process for their production and to their use in the production of coatings.

11 Claims, No Drawings

COATING COMPOSITIONS

CROSS-REFERENCE TO RELATED APPLICATIONS

The present application claims the right of priority under 35 U.S.C. §119(a)-(d) of German Patent Application Number 10 2006 053740.8, filed Nov. 15, 2006.

BACKGROUND OF THE INVENTION

The present invention relates to novel coating compositions comprising polyisocyanates, aliphatic oligocarbonate polyols, oligoester polyols and polyacrylate polyols, to a process for their production and to their use in the production of coatings.

Scratch-resistant finishing lacquers, especially for the automotive finishing lacquer sector and for automotive repair lacquering, have already been of great interest for many years. As well as having the property of a low tendency to scratching, for example in a car wash, such finishing lacquer systems are further required to have excellent resistance to solvents and acids.

Accordingly, the market has opened for 2-component ("2K") polyurethane ("PUR") systems that are distinguished by good resistance to solvents and chemicals while at the same time having good scratch resistance and excellent weather resistance.

Polyacrylates, optionally in admixture with polyesters as polyol binders, are often used in such systems. Aliphatic and/or cycloaliphatic polyisocyanates based on hexamethylene diisocyanate and/or isophorone diisocyanate are mainly used as crosslinkers.

Such 2K polyurethane coating compositions have achieved a very good overall property level, but scratching of the clear lacquer is frequently observed, especially in the case of dark colors, after frequent washing cycles in car washes. Depending on the elasticity of the lacquer layer, the scratches recede over time, which is referred to as the so-called reflow. However, if the elasticity of the clear lacquer layer is increased in order to improve the reflow behavior, then the lacquer loses surface hardness, and its resistance to solvents and chemicals especially, in particular its resistance to acids, is impaired [Carl Hanser Verlag, Munich, Mo. Metalloberfläche 54 (2000) 60-64]. Attempts are therefore being made in the art to improve the scratch resistance of 2K PUR lacquers by increasing the elasticity of the polyol component, mainly by combinations of polyacrylates and more elastic polyesters.

DE-A 198 24 118 describes low-solvent binders based on polyester-polyacrylate, which can be cured with di- and/or poly-isocyanates to give rapidly drying coatings with good adhesion. However, because of the high polyester content, they have inadequate resistance to acids and are not suitable for use in automotive finishing lacquers.

WO 96/20968 describes a coating composition for cars and heavy goods vehicles which comprises a polyacrylate based on alkyl-substituted cycloaliphatic (meth)acrylate monomers or alkyl-substituted aromatic vinyl monomers, a multi-hydroxy-functional oligoester and a polyisocyanate. However, because the oligoesters, as a result of their preparation, contain a relatively large number of secondary hydroxyl groups in addition to primary hydroxyl groups, and because very large amounts of these esters (>60 wt. %, based on the total formulation) must be used for low-viscosity coating compositions (<3,000 mPa·s/23° C.), they cure fully only very slowly and at relatively high temperatures, so that they are unsuitable for heat-sensitive substrates such as, for example, add-on elements made of plastics.

EP-A 0 896 991 describes coating compositions based on polyacrylate-polyester mixtures having polyester contents ≦10 wt. % and hydroxyl numbers from 40 to 125 mg KOH/g. Owing to the resulting low crosslinking densities, PUR lacquers produced therefrom do not have adequate resistance to solvents and chemicals. Moreover, the viscosity, at 3,000 to 5,000 mPa·s (23° C.) at a solids content of 70 wt. %, is too high for the formulation of high-solids PUR lacquers.

In several documents, such as, for example, in EP 1 101 780 A, EP 819 710 A and EP 778 298 A, mention is often made generally of the use of mixtures of polyacrylates with other polyols, such as, for example, polyesters and/or polycarbonates as polyol binders and reactants for polyisocyanate crosslinkers in 2K PUR lacquers, without giving details of the specific advantages of such mixtures. Furthermore, no information is given about the quantitative composition or the molecular weight and OH functionality of the polycarbonate polyol of such mixed systems.

On page 584 of the anonymous publication 493099 of the Research Disclosure of May 2005, polycarbonate diols and possible combinations thereof with other polyols, as well as corresponding polyurethane coatings, are described. The achievable properties of such lacquers, such as, for example, good adhesion, high gloss, hardness development, flow, resistance to alkalis, flexibility, elasticity, impact resistance and wear resistance, are mentioned generally, without corresponding test results or evidence. However, no information is to be found regarding an improvement in the scratch resistance of corresponding lacquers.

The object of the present invention was, therefore, to provide novel coating compositions which exhibit a marked improvement in scratch resistance without thereby impairing the resistance of the finishing lacquer systems to acids and solvents.

It has been found, surprisingly, that by using specific combinations of aliphatic oligocarbonate polyols, oligoester polyols, specific polyacrylate polyols, and polyisocyanates acting as crosslinkers or curing agents, it is possible to produce coating compositions that exhibit markedly improved scratch resistance while having equally good or even improved resistance to solvents and acids.

SUMMARY OF THE INVENTION

The invention accordingly provides coating compositions comprising
A) a polyol component consisting of
  a) from 5 to 40 wt. % aliphatic oligocarbonate polyols having a number-average molecular weight $M_n$ of from 200 to 5,000 g/mol,
  b) from 20 to 60 wt. % oligoester polyols having a number-average molecular weight of from 200 to 5,000 g/mol, and
  c) from 20 to 70 wt. % hydroxy-functional polyacrylate polyols,
and
B) one or more polyisocyanate crosslinkers that are reactive towards OH groups and have a mean NCO functionality of ≧2.0.

The amounts of a) to c) together equal 100 wt. %.

DETAILED DESCRIPTION OF THE PREFERRED EMBODIMENTS

In a) there are preferably used oligocarbonate polyols having a number-average molecular weight of from 200 to 3,000 g/mol, particularly preferably from 200 to 2,000 g/mol and most particularly preferably from 300 to 1,500 g/mol.

In a) there are preferably used aliphatic oligocarbonate polyols of the above-mentioned type having an OH functionality of from 1.5 to 5, particularly preferably from 1.7 to 4, most particularly preferably from 1.9 to 3.

The amount of component a) is preferably from 10 to 35 wt. %; a) is used particularly preferably in amounts of from 15 to 30 wt. % and most particularly preferably in amounts of from 15 to 25 wt. %.

The preparation of the aliphatic oligocarbonate polyols used in a) can be carried out by transesterification of monomeric dialkyl carbonates, such as dimethyl carbonate, diethyl carbonate, etc., with polyols having an OH functionality $\geq 2.0$, such as 1,4-butanediol, 1,3-butanediol, 1,5-pentanediol, 1,6-hexanediol, 3-methyl-1,5-pentanediol, 1,12-dodecanediol, cyclohexane-1,4-dimethanol, 3(4),8(9)-bis-(hydroxymethyl)-tricyclodecane, trimethylolpropane, glycerol, etc., and is described by way of example in EP-A 1 404 740 B1, Ex. 1 to 5 and EP-A 1 477 508 A1, Ex. 3.

For the coating compositions according to the invention there are preferably used aliphatic oligocarbonate polyols, and particularly preferably aliphatic oligocarbonate polyols having a molecular weight of from 200 to 2,000 g/mol, based on 1,4-butanediol, 1,6-hexanediol, 3-methyl-1,5-pentanediol, cyclohexane-1,4-dimethanol, trimethylolpropane, glycerol or mixtures thereof.

In b) there are preferably used aliphatic oligoester polyols having a number-average molecular weight of from 200 to 3,000 g/mol, particularly preferably from 200 to 2,000 g/mol and most particularly preferably from 300 to 1,500 g/mol.

In b) there are preferably used aliphatic oligoester polyols of the above-mentioned type having an OH functionality of from 1.5 to 6, particularly preferably from 2 to 4, most particularly preferably from 2 to 3.

The amount of component b) is preferably from 25 to 55 wt. %; b) is used particularly preferably in amounts of from 30 to 50 wt. % and most particularly preferably in amounts of from 35 to 45 wt. %.

The preparation of the aliphatic oligoester polyols used in b) can be carried out by reaction of cyclic lactones, such as ε-caprolactone or γ-butyrolactone, with polyols having an OH functionality $\geq 2.0$, such as 1,2-ethanediol, 1,2-propanediol, 1,3-propanediol, diethylene glycol, 1,4-butanediol, 1,3-butanediol, 1,5-pentanediol, 1,6-hexanediol, 3-methyl-1,5-pentanediol, 1,12-dodecanediol, cyclohexane-1,4-dimethanol, 3(4),8(9)-bis-(hydroxymethyl)-tricyclodecane, trimethylolpropane, glycerol, pentaerythritol, sorbitol, etc., and is described by way of example in EP-A 1 404 740 B1 Ex. 1 to 5 and EP-A 1 477 508 A1, Ex. 3.

For the coating compositions according to the invention there are preferably used aliphatic oligoester polyols, and particularly preferably aliphatic oligoester polyols having a molecular weight of from 200 to 2,000 g/mol, based on 1,4-butanediol, 3-methyl-1,5-pentanediol, 1,6-hexanediol, cyclohexane-1,4-dimethanol, trimethylolpropane, glycerol, pentaerythritol or mixtures thereof.

In c) there are preferably used polyacrylate polyols having a weight-average molecular weight of from 1,500 to 50,000 g/mol, particularly preferably from 2,000 to 30,000 g/mol and most particularly preferably from 2,000 to 20,000 g/mol, and a hydroxyl group content of from 1.0 to 10.0%, preferably from 1.5 to 8.0% and particularly preferably from 2.0 to 6.0%.

The amount of component c) is preferably from 25 to 65 wt. %; c) is used particularly preferably in amounts of from 30 to 55 wt. % and most particularly preferably in amounts of from 35 to 45 wt. %.

The polyacrylate polyols c) that are used are obtainable by copolymerizing with one another, according to methods known to the person skilled in the art, c1) from 0 to 10 wt. % of one or more optionally functional polybutadienes having a number-average molecular weight of from 500 to 10,000 g/mol and having a content of 1,2-lateral vinyl double bonds of at least 10 mol %, based on all vinyl double bonds present in the polybutadiene, c2) from 1 to 30 wt. % of one or more unsaturated aromatic monomers selected from the group styrene, α-methylstyrene and vinyltoluene, c3) from 20 to 80 wt. % of one or more hydroxyalkyl esters of acrylic or methacrylic acid that contain primary hydroxyl groups, c4) from 0 to 30 wt. % of one or more cycloaliphatic esters of acrylic or methacrylic acid and $C_3$ to $C_{12}$ monoalcohols, c5) from 10 to 60 wt. % of one or more aliphatic esters of acrylic or methacrylic acid and $C_1$ to $C_8$ monoalcohols, c6) from 0 to 5 wt. % of one or more α,β-unsaturated $C_3$-$C_7$-mono- or di-carboxylic acids or of one or more semiesters of maleic acid or fumaric acid and $C_1$ to $C_{14}$ monoalcohols, and c7) from 0 to 30 wt. % further copolymerisable compounds other than the compounds of components c1) to c6), the sum of the wt. % of components c1) to c7) being 100 wt. %.

The copolymers of component c) preferably consist of c1) from 0.1 to 8 wt. % of one or more optionally functional polybutadienes having a number-average molecular weight of from 600 to 5,000 g/mol and having a content of 1,2-lateral vinyl double bonds of at least 20 mol %, based on all vinyl double bonds present in the polybutadiene, c2) from 2 to 28 wt. % styrene, c3) from 25 to 70 wt. % of one or more compounds from the group consisting of hydroxyethyl acrylate, hydroxyethyl methacrylate and 1,4-butanediol monoacrylate, c4) from 0 to 25 wt. % of one or more cycloaliphatic esters of acrylic or methacrylic acid and $C_3$ to $C_{12}$ monoalcohols, c5) from 15 to 60 wt. % of one or more esters of acrylic or methacrylic acid and aliphatic $C_1$ to $C_8$ monoalcohols, c6) from 0 to 4 wt. % of one or more compounds from the group consisting of acrylic acid, methacrylic acid, maleic acid semiesters and fumaric acid semiesters of the corresponding acids and $C_1$ to $C_8$ monoalcohols, and c7) from 0 to 25 wt. % of one or more compounds from the group consisting of acrylonitrile, methacrylonitrile, hydroxypropyl (meth)acrylate, vinyl esters of aliphatic, optionally branched $C_1$-$C_{10}$-monocarboxylic acids, dialkyl or dicycloalkyl esters of maleic or fumaric acid and $C_3$ to $C_8$ monoalcohols, the sum of the wt. % of components c1) to c7) being 100 wt. %.

The copolymers of component c) particularly preferably consist of c1) from 0.2 to 6.0 wt. % of one or more optionally functional polybutadienes having a number-average molecular weight of from 700 to 4,000 g/mol and having a content of 1,2-lateral vinyl double bonds of at least 30 mol %, based on all vinyl double bonds present in the polybutadiene, c2) from 5 to 25 wt. % styrene, c3) from 30 to 65 wt. % hydroxyethyl acrylate, hydroxyethyl methacrylate or mixtures thereof, c4) from 0 to 20 wt. % of one or more compounds from the group consisting of isobornyl acrylate, isobornyl methacrylate, cyclohexyl (meth)acrylate, 3,5,5-trimethylcyclohexyl (meth)acrylate, 4-tert.-butylcyclohexyl (meth)acrylate, c5) from 20 to 50 wt. % of one or more esters of acrylic or methacrylic acid and aliphatic $C_1$ to $C_8$ monoalcohols, c6) from 0.1 to 3 wt. % acrylic acid, methacrylic acid or mixtures thereof, and c7) from 0 to 20 wt. % of one or more compounds from the group consisting of acrylonitrile, methacrylonitrile, hydroxypropyl (meth)acrylate, vinyl esters of aliphatic, optionally branched $C_1$-$C_{10}$-monocarboxylic acids, and dialkyl or dicycloalkyl esters of maleic or fumaric acid and $C_3$ to $C_8$ monoalcohols, the sum of the wt. % of components c1) to c7) being 100 wt. %.

The copolymers of component c) most particularly preferably consist of c1) from 0.4 to 5 wt. % of one or more optionally functional polybutadienes having a number-average molecular weight of from 750 to 3,500 g/mol and having a content of 1,2-lateral vinyl double bonds of at least 40 mol %, based on all vinyl double bonds present in the polybutadiene, c2) from 5 to 20 wt. % styrene, c3) from 30 to 60 wt. % hydroxyethyl acrylate, hydroxyethyl methacrylate or mixtures thereof, c4) from 0 to 15 wt. % of one or more compounds from the group consisting of isobornyl acrylate, isobornyl methacrylate, cyclohexyl (meth)acrylate, 3,5,5-trimethylcyclohexyl (meth)acrylate and 4-tert.-butylcyclohexyl (meth) acrylate, c5) from 25 to 45 wt. % of one or more esters of acrylic or methacrylic acid and aliphatic $C_1$ to $C_4$ monoalcohols, c6) from 0.3 to 2 wt. % acrylic acid, methacrylic acid or mixtures thereof, and c7) from 0 to 15 wt. % of one or more compounds from the group consisting of hydroxypropyl (meth)acrylate, vinyl esters of aliphatic, optionally branched $C_1$-$C_9$-monocarboxylic acids, dialkyl or di(cyclo)alkyl esters of maleic or fumaric acid and $C_3$ to $C_6$ monoalcohols, the sum of the wt. % of components c1) to c7) being 100 wt. %.

The preparation of the resins of component c) is carried out by copolymerization of constituents c1) to c7) according to conventional methods well known to the person skilled in the art [Houben-Weyl (eds.): Methods of Organic Chemistry, 4th ed., E 20/2, Thieme, Stuttgart 1987, p. 1156], preference being given to the free-radical solution polymerization of components c1) to c7) at temperatures of from 80 to 240° C. in the presence of free-radical formers.

The monomers or oligomers c1) to c7) are generally incorporated into the copolymer in the same ratios as used for the polymerization. The incorporated units are distributed substantially randomly.

Suitable starting materials c1) for the copolymers c) that are fundamental to the invention are in principle any polybutadienes having a number-average molecular weight of from 500 to 10,000 g/mol that have a content of vinyl double bonds in the lateral 1,2-position of at least 10 mol %, preferably at least 20 mol %, particularly preferably at least 40 mol %, based on all vinyl double bonds present in the polybutadiene.

As compounds of component c1) there are typically used polybutadiene isomeric mixtures in which from 10 to 90 mol % of the vinyl double bonds are in the 1,2-position, from 10 to 70 mol % are in the 1,4-cis- and/or 1,4-trans-position, and from 0 to 30 mol % are in cyclic structures.

The polybutadienes used can optionally also carry functional groups, such as, for example, hydroxyl groups or carboxyl groups.

An overview of suitable polybutadienes of the above-mentioned type is given in "Makromoleküle" by H. G. Elias, 4th edition, Hüthig und Wepf-Verlag, Basle, Heidelberg, N.Y., pages 676 and 744 to 746 and 1012ff.

The preparation of the copolymers c) can be carried out in the presence of a solvent. Examples of suitable solvents include aliphatic, cycloaliphatic and/or aromatic hydrocarbons, such as alkylbenzenes, for example toluene, xylene; esters, such as ethyl acetate, n-propyl acetate, isopropyl acetate, n-butyl acetate, n-hexyl acetate, 2-ethylhexyl acetate, ethyl propionate, butyl propionate, pentyl propionate, ethylene glycol monoethyl ether acetate, the corresponding methyl ether acetate; methoxypropyl acetate, ethers, such as ethylene glycol acetate mono-methyl, -ethyl or -butyl ether; ketones, such as acetone, methyl ethyl ketone, methyl isobutyl ketone, methyl n-amyl ketone, and mixtures of such solvents.

The preparation of the copolymers c) can be carried out continuously or discontinuously.

In the case of continuous preparation, the monomer mixture and the initiator are metered uniformly and continuously into a polymerization reactor, and at the same time the corresponding amount of polymer is removed continuously, so that very uniform copolymers are obtained.

In the case of discontinuous preparation, the monomer mixture and the initiator are metered into the polymerization reactor, the polymer remaining in the reactor. In order to obtain copolymers whose structure is as uniform as possible, the monomer mixture and the initiator are metered into the reactor at a constant rate.

Within the scope of the invention, uniform copolymers are understood as being copolymers having a narrow molecular weight distribution and a low degree of non-homogeneity (U), defined as the ratio of the weight average molecular weight to the number average molecular weight (Mw/Mn), of preferably U≦2.5, as well as almost equal monomer composition of the molecule chains.

The copolymerization is generally carried out in the temperature range from 80 to 240° C., preferably from 100 to 220° C. and particularly preferably from 120 to 200° C.

The copolymerization can be carried out under a pressure of up to 15 bar.

The initiators are used in amounts of from 0.05 to 15 wt. %, preferably from 1 to 10 wt. %, especially from 2 to 8 wt. %, based on the total amount of components c1) to c7).

Suitable initiators for the preparation of the copolymers c) are conventional azo- or peroxide-based free-radical initiators, but only those which have a sufficiently long half-life for the polymerization of from about 5 seconds to about 30 minutes in the above-mentioned temperature range. Examples of suitable initiators include 2,2'-azobis-(2-methylpropanenitrile), 2,2'-azobis-(2-methylbutanenitrile), 1,1'-azobis-(cyclohexane-carbonitrile), tert.-butylperoxy 2-ethylhexanoate, tert.-butylperoxy diethylacetate, tert.-butylperoxy isobutyrate, 1,1-di-tert.-butylperoxy-3,3,5-trimethyl-cyclohexane, 1,1-di-tert.-butylperoxycyclohexane, tert.-butylperoxy 3,5,5-trimethylhexanoate, tert.-butyl-peroxy isopropylcarbonate, tert.-butylperoxy acetate, tert.-butylperoxy benzoate, dicumyl peroxide, tert.-butylcumyl peroxide, di-tert.-butyl peroxide and di-tert.-amyl peroxide.

In a particular embodiment, the polyacrylate polyols c) are prepared in the presence of at least one of the oligocarbonate polyols a) and/or oligoester polyols b) in accordance with the above-described processes. The polymerization can be carried out either in the absence of organic solvents, in which case the oligocarbonate polyol and/or the oligoester polyol constitutes the reaction medium for the free-radical polymerization, or in mixtures of organic solvents and oligocarbonate polyols a) and/or oligoester polyols b).

The polyisocyanate crosslinkers B) that are reactive towards OH groups are any desired polyisocyanates having a uretdione, isocyanurate, allophanate, biuret, iminooxadiazinedione and/or oxadiazinetrione structure that have been prepared by modification of simple aliphatic, cycloaliphatic, araliphatic and/or aromatic diisocyanates and are composed of at least two diisocyanates, as are described by way of example in, for example, J. Prakt. Chem. 336 (1994) 185-200, specifications DE-A 16 70 666, 19 54 093, 24 14 413, 24 52 532, 26 41 380, 37 00 209, 39 00 053 and 39 28 503 or EP-A 336 205, 339 396 and 798 299.

Suitable diisocyanates for the preparation of such polyisocyanates are any desired diisocyanates having a molecular weight in the range from 140 to 400 g/mol that are obtainable by phosgenation or by phosgene-free processes, for example by thermal urethane cleavage, and that have aliphatically, cycloaliphatically, araliphatically and/or aromatically bonded isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanato-methylcyclohexane, bis-(isocyanatomethyl)-norbornane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenyl-methane (MDI), 1,5-diisocyanatonaphthalene or any desired mixtures of such diisocyanates.

Preference is given to polyisocyanates or polyisocyanate mixtures of the mentioned type having isocyanate groups bonded solely aliphatically and/or cycloaliphatically.

Very particular preference is given to polyisocyanates or polyisocyanate mixtures having an isocyanurate structure based on HDI, IPDI and/or 4,4'-diisocyanato-dicyclohexyl-methane.

It is also possible to use so-called blocked polyisocyanates and/or isocyanates, preferably blocked polyisocyanates or polyisocyanate mixtures, most particularly preferably blocked polyisocyanates or polyisocyanate mixtures having an isocyanurate structure based on HDI, IPDI and/or 4,4'-diisocyanatodicyclohexyl-methane.

The blocking of (poly)isocyanates in order temporarily to protect the isocyanate groups is a procedure which has been known for a long time and is described, for example, in Houben Weyl, Methoden der organischen Chemie XIV/2, p. 61-70. There come into consideration as blocking agents any compounds that can be cleaved when the blocked (poly) isocyanate is heated, optionally in the presence of a catalyst. Examples of suitable blocking agents include sterically demanding amines, such as dicyclohexylamine, diisopropylamine, N-tert.-butyl-N-benzylamine, caprolactam, butanoneoxime, imidazoles with the various conceivable substitution patterns, pyrazoles, such as 3,5-dimethylpyrazole, triazoles and tetrazoles, as well as alcohols, such as isopropanol, ethanol, tert.-butanol. In addition, it is also possible to block the isocyanate group in such a manner that, during a further reaction, the blocking agent is not cleaved but the intermediate stage formed as an intermediate reacts to completion. That is the case with cyclopentanone-2-carboxyethyl ester in particular, which reacts completely into the polymeric network in the thermal crosslinking reaction and is not cleaved again.

In particular when blocked polyisocyanates are used, further reactive compounds containing groups that are reactive towards OH or NH groups can be used as additional crosslinker components in addition to component B). Examples of such compounds are aminoplastic resins.

Aminoplastic resins are to be regarded as being the condensation products of melamine and formaldehyde or of urea and formaldehyde that are known in lacquer technology. Any conventional melamine-formaldehyde condensation products that are not etherified or have been etherified by saturated monoalcohols having from 1 to 4 carbon atoms are suitable. In the case of the concomitant use of other crosslinker components, the amount of binder having NCO-reactive hydroxyl groups must be adjusted accordingly.

As catalysts for the reaction of component A) with component B) to produce the coating compositions according to the invention there can be used catalysts such as commercially available organometal compounds of the elements aluminium, tin, zinc, titanium, manganese, iron, bismuth or zirconium, such as dibutyltin laurate, zinc octoate, titanium tetraisopropylate. However, tertiary amines, such as, for example, 1,4-diazabicyclo-[2.2.2]-octane, are also suitable.

It is also possible to accelerate the reaction of component B) with component A) by carrying out the curing at temperatures of from 20 to 200° C., preferably from 60 to 180° C., particularly preferably from 70 to 150° C.

In addition to the polyol mixture A) that is fundamental to the invention, it is also possible to use further organic polyhydroxyl compounds or aminic reactive diluents known to the person skilled in the art from polyurethane lacquer technology.

These other polyhydroxyl compounds can be the conventional polyether polyols, polyurethane polyols or further polycarbonate, polyester and polyacrylate polyols not described hitherto. If such further organic polyhydroxyl compounds are used in addition to the polyol component A) that is fundamental to the invention, there are preferably used the polyacrylate polyols and/or polyester polyols of the prior art that are known per se. The aminic reactive diluents can be products having blocked amino groups, such as aldimines or ketamines, or those which contain amino groups that are still free but have diminished reactivity, such as aspartic acid esters. In general, the aminic reactive diluents contain more than one (blocked) amino group, so that they contribute to the construction of the polymeric lacquer film network during the crosslinking reaction.

If further polyhydroxyl compounds or aminic reactive diluents of the above-mentioned type are used in addition to polyol component A) according to the invention, the amount of those additional compounds that are reactive towards isocyanates is not more than 50 wt. %, preferably not more than 30 wt. %, based on the amount of component A) that is fundamental to the invention. It is particularly preferred, however, to use polyol component A) that is fundamental to the invention as the only polyol component in the coating compositions according to the invention.

The ratio of component B) to component A) and optional further crosslinkers and curing agents is such that a NCO/OH ratio of the free and optionally blocked NCO groups to the isocyanate-reactive groups of from 0.3 to 2, preferably from 0.4 to 1.5, particularly preferably from 0.5 to 1.2, is obtained.

In addition to components A) and B) that are fundamental to the invention, it is also possible to use in the coating compositions according to the invention auxiliary substances that are conventional in coating technology, such as inorganic or organic pigments, further organic light stabilizers, free-radical acceptors, lacquer additives, such as dispersing agents, flow agents, thickeners, antifoams and other auxiliary substances, adhesives, fungicides, bactericides, stabilizers or inhibitors and further catalysts.

The coating compositions according to the invention are preferably used in the following fields: automotive base lacquering, plastics lacquering, general industrial lacquering, large-vehicle lacquering, automotive repair lacquering, floor coating and/or wood/furniture lacquering.

The invention therefore also provides coatings and coated substrates obtainable using the coating compositions according to the invention.

EXAMPLES

Desmophen® A 870: hydroxyl-group-containing polyacrylate from Bayer MaterialScience AG, Leverkusen, DE; about 70% in butyl acetate, hydroxyl content according to DIN 53 240/2 about 2.95%.

Desmophen® VP LS 2971: elastifying, hydroxyl-group-containing polyester from Bayer MaterialScience AG, Leverkusen, DE; about 80% in butyl acetate, hydroxyl content according to DIN 53 240/2 about 3.8%.

Desmodur® N 3600: aliphatic polyisocyanurate from Bayer MaterialScience AG, Leverkusen, DE; 100 wt. %, with an NCO content according to DIN EN ISO 11909 of 23 wt. %.

Desmodur® N 3390 BA: aliphatic polyisocyanurate from Bayer MaterialScience AG, Leverkusen, DE; 90 wt. % in n-butyl acetate with an NCO content according to DIN EN ISO 11909 of 19.6 wt. %.

The hydroxyl number (OH number) was determined in accordance with DIN 53240-2.

The viscosity was determined by means of a "MCR 51" rotary viscometer from Paar, Germany in accordance with DIN EN ISO 3219.

The acid number was determined in accordance with DIN EN ISO 2114.

The color value (APHA) was determined in accordance with DIN EN 1557.

Example 1

Oligocarbonate Diol a1

Preparation of an Aliphatic Oligocarbonate Diol Based on 1,6-hexanediol/1,4-butanediol, having a Number-average Molecular Weight of 2,000 g/mol:

1,390 g of 1,4-butanediol, 608 g of 1,6-hexanediol with 0.7 g of yttrium(III) acetylacetonate and 914 g of dimethyl carbonate were placed at 80° C. in a 6-liter pressurized reactor equipped with a fractionating column, a stirrer and a receiver. The reaction mixture was then heated to 150° C. in a period of 2 hours, under a nitrogen atmosphere, and was maintained at that temperature, with stirring and under reflux, for 2 hours, the pressure rising to 3.9 bar (absolute). The cleavage product methanol, mixed with dimethyl carbonate, was then removed by distillation, the pressure being reduced continuously by a total of 2.2 bar in the course of 4 hours. The distillation operation was then complete; a further 914 g of dimethyl carbonate were metered into the reaction mixture at 150° C., and the mixture was maintained at that temperature, with stirring and under reflux, for 2 hours, the pressure rising to 3.9 bar (absolute). The cleavage product methanol, mixed with dimethyl carbonate, was then again removed by distillation, the pressure being reduced continuously by a total of 2.2 bar in the course of 4 hours. The distillation operation was then complete; a further 782 g of dimethyl carbonate were metered into the reaction mixture at 150° C., and the mixture was maintained at that temperature, with stirring and under reflux, for 2 hours, the pressure rising to 3.5 bar (absolute). The cleavage product methanol, mixed with dimethyl carbonate, was then again removed by distillation, the pressure being reduced to normal pressure in the course of 4 hours. The reaction mixture was subsequently heated to 180° C. in the course of 2 hours and maintained at that temperature for 2 hours, with stirring. The temperature was then lowered to 130° C., and a stream of nitrogen (5 liters/hour) was passed through the reaction mixture, while the pressure was lowered to 20 mbar. The temperature was then raised to 180° C. within 4 hours and maintained for 6 hours. Methanol mixed with dimethyl carbonate was again removed from the reaction mixture. After aeration and cooling of the reaction mixture to room temperature, a colorless, wax-like oligocarbonate diol having the following characteristics was obtained:

$M_n$=1,968 g/mol; OH number=57 mg KOH/g; viscosity: 3,513 mPa·s at 75° C., Hazen color value: 47 APHA.

Example 2

Oligocarbonate Diol a2

Preparation of an Aliphatic Oligocarbonate Diol Based on 3-methyl-1,5-pentanediol, having a Number-average Molecular Weight of 650 g/mol Procedure as in Example 1, there being placed in a 60-liter pressurized reactor, instead of 1,6-hexanediol, 34,092 g of 3-methyl-1,5-pentanediol and 8.0 g of ytterbium(III) acetylacetonate, and dimethyl carbonate being added in three steps, twice in an amount of 10,223 g and once in an amount of 7,147 g.

A colorless, liquid oligocarbonate diol having the following characteristics was obtained: $M_n$=675 g/mol; OH number=166.0 mg KOH/g; viscosity: 4,146 mPa·s at 23° C., Hazen color value: 17 APHA.

Example 3

Oligocarbonate Diol a3

Preparation of an Aliphatic Oligocarbonate Diol Based on Polytetrahydrofuran 250 (Molecular Weight 250 g/mol), having a Number-average Molecular Weight of 1,000 g/mol.

Procedure as in Example 1, there being placed in a 6-liter pressurised reactor, instead of 1,6-hexanediol, 3,259 g of polytetrahydrofuran 250 and 0.7 g of yttrium(III) acetylacetonate, and dimethyl carbonate being added in three steps, twice in an amount of 439 g and once in an amount of 376 g.

A colorless, liquid oligocarbonate diol having the following characteristics was obtained: $M_n$=1,002 g/mol; OH number=112 mg KOH/g; viscosity: 1,360 mPa·s at 23° C., Hazen color value: 13 APHA.

Example 4

Oligocarbonate Diol a4

Preparation of an Aliphatic Oligocarbonate Diol Based on Cyclohexanedimethanol and 1,4-butanediol, having a Number-average Molecular Weight of 500 g/mol Procedure as in Example 1, there being placed in a 6-liter pressurized reactor, instead of 1,6-hexanediol, 2,119 g of cyclohexane-1,4-dimethanol, 1,325 g of 1,4-butanediol and 0.8 g of yttrium(III) acetylacetonate, and dimethyl carbonate being added in three steps, twice in an amount of 1,012 g and once in an amount of 867 g.

A colorless, liquid oligocarbonate diol having the following characteristics was obtained: $M_n$=492 g/mol; OH number=228 mg KOH/g; viscosity: 87,700 mPa·s at 23° C., Hazen color value: 35 APHA.

Example 5

Oligoester Polyol b1

Preparation of an Aliphatic Oligoester Polyol Based on Trimethylolpropane 3,155 g of trimethylolpropane, 1,345 g of ε-caprolactone and 2.25 g of dibutyltin dilaurate (DBTL) were weighed into a reactor according to Example 1. The contents of the vessel were heated to 160° C., stirred for 6 hours at 160° C. and then cooled to 20° C., a clear resin having the following characteristics being obtained: solids content: 99.5 wt. %, viscosity at 23° C.: 4,100 mPa·s, acid number: 0.5 mg KOH/g, hydroxyl number: 881 mg KOH/g, hydroxyl content: 26.7 wt. %, Hazen color value: 44 APHA.

Example 6

Oligoester Polyol b2

Preparation of an Aliphatic Oligoester Based on Trimethylolpropane 2,747 g of trimethylolpropane, 1,753 g of ε-caprolactone and 2.25 g of dibutyltin dilaurate (DBTL) were weighed into a reactor according to Example 1. The contents of the vessel were heated to 160° C., stirred for 6 hours at 160° C. and then cooled to 20° C., a clear resin having the following characteristics being obtained: solids content: 99.5 wt. %, viscosity at 23° C.: 3,300 mPa·s, acid number: 1.0 mg KOH/g, hydroxyl number: 766 mg KOH/g, hydroxyl content: 23.2 wt. %, Hazen color value: 72 APHA.

Example 7

Oligoester Polyol b3

Preparation of an Aliphatic Oligoester Based on Trimethylolpropane 1,977 g of trimethylolpropane, 2,523 g of ε-caprolactone and 2.25 g of dibutyltin dilaurate (DBTL) were weighed into a reactor according to Example 1. The contents of the vessel were heated to 160° C., stirred for 6 hours at 160° C. and then cooled to 20° C., a clear resin having the following characteristics being obtained: solids content: 99.6 wt. %, viscosity at 23° C.: 2,080 mPa·s, acid number: 0.6 mg KOH/g, hydroxyl number: 542 mg KOH/g, hydroxyl content: 16.4 wt. %, Hazen color value: 48 APHA.

Example 8

Oligoester Polyol b4

Preparation of an Aliphatic Oligoester Based on Trimethylolpropane 1,407 g of trimethylolpropane, 3,593 g of ε-caprolactone and 2.25 g of dibutyltin dilaurate (DBTL) were weighed into a reactor according to Example 1. The contents of the vessel were heated to 160° C., stirred for 6 hours at 160° C. and then cooled to 20° C., a clear resin having the following characteristics being obtained: solids content: 100.0 wt. %, viscosity at 23° C.: 1,730 mPa·s, acid number: 0.5 mg KOH/g, hydroxyl number: 356 mg KOH/g, hydroxyl content: 10.8 wt. %, Hazen color value: 17 APHA.

Example 9

Oligoester Polyol b5

Preparation of an Aliphatic Oligoester Based on Trimethylolpropane 737 g of trimethylolpropane, 3,763 g of ε-caprolactone and 2.25 g of dibutyltin dilaurate (DBTL) were weighed into a reactor according to Example 1. The contents of the vessel were heated to 160° C., stirred for 6 hours at 160° C. and then cooled to 20° C., a clear resin having the following characteristics being obtained: solids content: 99.8 wt. %, viscosity at 23° C.: 1,750 mPa·s, acid number: 0.9 mg KOH/g, hydroxyl number: 202 mg KOH/g, hydroxyl content: 6.1 wt. %, Hazen color value: 28 APHA.

Example 10

Oligoester Polyol b6

Preparation of an Aliphatic Oligoester Based on Glycerol 2,010 g of glycerol, 2,490 g of ε-caprolactone and 2.25 g of dibutyltin dilaurate (DBTL) were weighed analogously to Example 1. The contents of the vessel were heated to 160° C., stirred for 6 hours at 160° C. and then cooled to 20° C., a clear resin having the following characteristics being obtained: solids content: 100.0 wt. %, viscosity at 23° C.: 980 mPa·s, acid number: 1.2 mg KOH/g, hydroxyl number: 811 mg KOH/g, hydroxyl content: 24.6 wt. %, Hazen color value: 23 APHA.

Examples 11 to 13

Preparation Instructions for Copolymers c1 to c3

Part 1 was placed in a 6-liter stainless steel pressurized reactor equipped with a stirrer, a distillation device, a feed vessel for monomer mixture and initiator, including metering pumps, and automatic temperature control, and was heated to the desired polymerization temperature. There were then metered in through separate inlets, starting at the same time, part 2 (monomer mixture) in a period of 3 hours and part 3 (initiator solution) in a period of 3.5 hours, the polymerization temperature being kept constant (±2° C.). Stirring was then carried out for 60 minutes at the polymerization temperature. The mixture was then cooled to room temperature and the solids content was determined. The copolymers were to have a solids content of 70±1%. If the solids content was ≦68%, post-activation was carried out for 30 minutes at 150° C. with 5% of the original amount of initiator. If the solids content was between 68 and 69%, distillation was carried out to 70±1%. The copolymer was then filtered (Supra T5500, pore size 25-72 μm, Seitz-Filter-Werke GmbH, Bad Kreuznach, DE). The compositions of parts 1 to 3 in wt. % and the characteristics of the products are indicated in Table 1.

TABLE 1

| Copolymer | c1 | c2 | c3 |
|---|---|---|---|
| Part 1 | | | |
| Butyl acetate | — | — | 25.00 |
| Solvent naphtha 100[1] | 25.00 | 25.00 | — |
| Part 2 | | | |
| Styrene | 10.79 | 11.89 | 27.44 |
| Hydroxyethyl methacrylate | 21.81 | 21.81 | 23.00 |
| Butyl acrylate | 33.51 | 33.51 | 17.04 |
| Polybutadiene Nisso ® B 1000[2] | 0.95 | — | — |
| Polybutadiene Lithene ® AL[3] | — | 0.95 | — |
| Acrylic acid | 1.09 | — | 0.68 |
| Part 3 | | | |
| Di-tert.-butyl peroxide | 2.84 | 2.84 | 2.84 |
| Butyl acetate | — | — | 4.00 |
| Solvent naphtha 100[1] | 4.00 | 4.00 | — |
| Polymerization temperature, °C. | 160 | 160 | 170 |
| Characteristics | | | |
| Solids content [wt. %] | 70.5 | 69.4 | 70.1 |
| Viscosity at 23° C. [mPa · s] | 3710 | 1140 | 3582 |
| Acid number, as supplied [mg KOH/g] | 10.1 | 1.8 | 7.8 |
| OH number, as supplied [mg KOH/g] | 91 | 93 | 97 |
| OH content, solid resin [wt. %] | 3.9 | 4.1 | 4.2 |
| Hazen color value, as supplied [APHA] | 24 | 19 | 15 |

All amounts (parts 1 to 3) are to be understood as being in wt. %.
[1] Commercial product of DHC Solvent Chemie GmbH, D-45478 Mülheim an der Ruhr
[2] Commercial product of Nippon Soda, Japan
[3] Commercial product of Synthomer GmbH, Frankfurt/Main

TABLE 2

Compositions of polyol mixtures A1 to A8 according to the invention in wt. %, based on solid resin

| Polyol mixture | A1 | A2 | A3 | A4 | A5 | A6 | A7 | A8 |
|---|---|---|---|---|---|---|---|---|
| Component a1 | 5 | — | — | — | — | — | — | 25 |
| Component a2 | — | — | — | 20 | — | 15 | — | — |
| Component a3 | — | — | 10 | — | 40 | — | — | — |
| Component a4 | — | 40 | — | — | — | — | 20 | — |
| Component b1 | — | — | — | 40 | — | — | 30 | — |
| Component b2 | — | — | — | — | — | 45 | — | — |
| Component b3 | — | — | — | — | 40 | — | — | — |
| Component b4 | 60 | — | — | — | — | — | — | 30 |
| Component b5 | — | — | 20 | — | — | — | — | — |
| Component b6 | — | 20 | — | — | — | — | — | — |
| Component c1 | — | 40 | — | — | — | 40 | — | 45 |
| Component c2 | — | — | 70 | 40 | — | — | 50 | — |
| Component c3 | 35 | — | — | — | 20 | — | — | — |

TABLE 3

Characteristics of polyol mixtures A1 to A8 according to the invention

| | A1 | A2 | A3 | A4 | A5 | A6 | A7 | A8 |
|---|---|---|---|---|---|---|---|---|
| Solids content [wt. %] | 87.0 | 84.8 | 76.5 | 84.4 | 92.8 | 85.7 | 81.5 | 84.7 |
| Viscosity at 23° C. [mPa · s] | 2280 | 7520 | 1050 | 1900 | 1870 | 3480 | 2580 | 6080 |
| Acid number [mg KOH/g] | 4.0 | 5.1 | 2.4 | 1.8 | 2.2 | 5.3 | 1.7 | 5.8 |
| OH number [mg KOH/g] | 228 | 226 | 112 | 377 | 268 | 359 | 306 | 151 |
| OH content solid resin [%] | 7.9 | 9.5 | 4.4 | 13.5 | 8.7 | 12.7 | 11.4 | 5.4 |

Examples 14 to 21

Preparation of Polyol Components A According to the Invention

The oligocarbonate diols a), the oligoester polyols b) and the polyacrylate polyols c) are stirred in a one-liter glass flask for one hour at 60° C. under a nitrogen atmosphere. The resulting polyol mixtures are then cooled to room temperature, their characteristics are determined, and they are kept ready for the application examples. The compositions in wt. % (based on solid resin) of polyol components A1) to A8) according to the invention are indicated in Table 2 and the corresponding characteristics are indicated in Table 3.

Application Examples

Example 22

Preparation of a Stock Lacquer (Component 22A)

1.4 g of Baysilone® OL 17 (10% solution in MPA; Borchers GmbH, Langenfeld), 2.8 g of Tinuvin® 292 (50% solution in MPA, Ciba Spezialitätenchemie Lampertheim GmbH, Lampertheim), 4.2 g of Tinuvin® 382/4 (50% solution in MPA, Ciba Spezialitätenchemie Lampertheim GmbH, Lampertheim), 1.4 g of Modaflow® (1% solution in MPA; Brenntag AG, Mülheim/R), and 34.8 g of a 1:1 mixture of 1-methoxypropyl 2-acetate and solvent naphtha 100 were added to 120.0 g of polyol A3, and the mixture was stirred intimately.

Preparation of the Curing Agent Solution (Component 22B)

23.4 g of a 1:1 mixture of 1-methoxypropyl 2-acetate and solvent naphtha 100 were added to 43.4 g of Desmodur® N 3600, and the mixture was stirred intimately.

Examples 23 to 25 and Comparison Examples C1 and C2

Same procedure as in Example 22A or 22B. However, the raw materials listed in Table 4 and Table 5 were used.

TABLE 4

| Stock lacquer | 23 A | 24 A | 25 A |
|---|---|---|---|
| Polyol | A4 | A5 | A8 |
| Weighed amount [g] | 100.0 | 100.0 | 100.0 |

TABLE 4-continued

| | | | |
|---|---|---|---|
| Baysilone ® OL 17 (10% MPA) [g] | 1.28 | 1.41 | 1.29 |
| Tinuvin ® 292 (50% MPA) [g] | 2.57 | 2.83 | 2.58 |
| Tinuvin ® 382/4 (50% MPA) [g] | 3.85 | 4.24 | 3.87 |
| Modaflow ® (1% MPA) [g] | 1.28 | 1.41 | 1.29 |
| 1-Methoxypropyl 2-acetate/solvent naphtha 100 (1:1) [g] | 42.31 | 56.47 | 42.81 |
| Curing agent | 23B | 24B | 25B |
| Desmodur ® N 3600 [g] | 122.35 | — | — |
| Desmodur ® N 3390 BA [g] | — | 101.77 | 57.65 |
| 1-Methoxypropyl 2-acetate/solvent naphtha 100 (1:1) [g] | 76.52 | 45.34 | 23.78 |

TABLE 5

| Comparison example | C1 | C2 |
|---|---|---|
| Stock lacquer (A) | | |
| Desmophen ® A 870 [g] | 64.6 | 86.9 |
| Desmophen ® VP LS 2971 [g] | 18.9 | — |
| Baysilone ® OL 17 (10% xylene) [g] | 0.9 | 0.9 |
| Tinuvin ® 292 (10% xylene) [g] | 9.1 | 9.1 |
| Tinuvin ® 1130 (10% xylene) [g] | 18.1 | 18.1 |
| Modaflow ® (1% xylene) [g] | 0.9 | 0.9 |
| 1-Methoxypropyl 2-acetate/solvent naphtha 100 (1:1) [g] | 11.9 | 8.7 |
| Butyl glycol acetate [g] | — | 3.6 |
| Curing agent (B) | | |
| Desmodur ® N 3390 BA [g] | 33.8 | 33.1 |
| 1-Methoxypropyl 2-acetate/solvent naphtha 100 (1:1) [g] | 11.9 | 8.6 |

Mixing of the Stock Lacquer with the Curing Agent and Application of the Lacquer:

The above-indicated components A (stock lacquer) and B (curing agent) were in each case mixed together and stirred intimately. Each of the mixtures was then applied by means of an air gun to coil-coat metal sheets pre-coated with black base lacquer, exposed to air for 10 minutes at room temperature and then baked in a circulating air oven at 140° C. for 30 minutes. Brilliant, high-gloss coatings having a dry film thickness of about 40 μm were obtained. An overview of the determined lacquer-related properties of the coatings is shown in Table 6.

TABLE 6

Lacquer-related properties of coatings

| | Example | | | | Comp. 1 | Comp. 2 |
|---|---|---|---|---|---|---|
| | 22 | 23 | 24 | 25 | | |
| Pendulum hardness (s) on glass | 183 | 175 | 169 | 178 | 182 | 197 |
| FAM/xylene, 10 min. | 2/2 | 2/2 | 2/2 | 2/2 | 2/2 | 2/2 |
| Haze | 10 | 9 | 9 | 10 | 11 | 10 |
| Scratch resistance | | | | | | |
| Gloss beforehand (20°) | 88 | 86 | 89 | 88 | 91 | 92 |
| Gloss after 10 cycles (20°) | 78 | 83 | 74 | 80 | 58 | 52 |
| Rel. residual gloss (%) | 89 | 96 | 83 | 91 | 63 | 56 |
| Gloss after 2 hours 60° C. reflow | 82 | 84 | 81 | 83 | 75 | 76 |
| Rel. residual gloss after reflow (%) | 93 | 98 | 91 | 94 | 82 | 82 |

TABLE 6-continued

Lacquer-related properties of coatings

| | Example | | | | Comp. 1 | Comp. 2 |
|---|---|---|---|---|---|---|
| | 22 | 23 | 24 | 25 | | |
| Resistance to chemicals | | | | | | |
| Tree resin | 36 | 38 | 38 | 38 | 36 | 38 |
| Pancreatin | 36 | 36 | 36 | 36 | 36 | 36 |
| Demineralised water | 43 | 46 | 45 | 44 | 40 | 44 |
| NaOH, 1% | 42 | 46 | 44 | 42 | 42 | 42 |
| $H_2SO_4$, 1% | 43 | 44 | 45 | 43 | 41 | 45 |

Test Methods:

Pendulum Hardness:

The pendulum hardness was determined in accordance with DIN EN ISO 1522.

Resistance to Petrol:

Test with FAM test fuel in accordance with DIN 51 635, based on VDA 621-412 (test A 4.1.1 Y and 4.1.3 Y) and xylene; exposure time 10 minutes.

Scratch Resistance:

The scratch resistance was determined in accordance with DIN 55668—method for "Testing the scratch resistance of coatings using a laboratory washing installation". Measurement of the degree of gloss as the reflectometer value in accordance with DIN 67 530 before and after subjection to 10 to-and-fro cycles and again after 2 hours' storage at 60° C. (reflow behavior).

Resistance to Chemicals:

The resistance to chemicals was determined in accordance with DIN EN ISO 2812/5 (draft) in a gradient oven.

The coatings according to the invention of Examples 22 to 25 exhibit better scratch resistance—both before and after reflow—than those of Comparison Examples 1 and 2. The resistance of the coatings according to the invention to chemicals is overall also better than that of the two comparison examples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising
    A) a polyol component consisting of
        a) from 5 to 40 wt. % of one or more aliphatic oligocarbonate polyols having a number-average molecular weight $M_n$ of from 200 to 5,000 g/mol,
        b) from 20 to 60 wt. % of one or more oligoester polyols having a number-average molecular weight of from 200 to 5,000 g/mol, and
        c) from 20 to 70 wt. % of one or more hydroxy-functional polyacrylate polyols,
    the amounts of a), b) and c) totaling 100 wt. %, and
    B) one or more polyisocyanate crosslinkers that are reactive towards OH groups and have a mean NCO functionality of $\geqq 2.0$.

2. A coating composition according to claim 1, wherein the amount of component a) is from 10 to 35 wt. %, the amount of component b) is from 25 to 55 wt. % and the amount of component c) is from 25 to 65 wt. %.

3. A coating composition according to claim 1, wherein component a) comprises one or more aliphatic oligocarbonate diols having a molecular weight of from 200 to 2,000 g/mol that are based on components selected from the group consisting of 1,4-butanediol, 1,6-hexanediol, 3-methyl-1,5-pentanediol, cyclohexane-1,4-dimethanol, trimethylolpropane, glycerol and mixtures thereof.

4. A coating composition according to claim 1, wherein component b) comprises one or more aliphatic oligoester polyols having a molecular weight of from 200 to 2,000 g/mol that are based on components selected from the group consisting of $\epsilon$-caprolactone and 1,4-butanediol, 1,6-hexanediol, 3-methyl-1,5-pentanediol, cyclohexane-1,4-dimethanol, trimethylolpropane, glycerol, pentaerythritol and mixtures of those alcohols.

5. A coating composition according to claim 1, wherein component c) comprises one or more copolymers of
- c1) from 0.4 to 5 wt. % of one or more optionally functional polybutadienes having a number-average molecular weight of from 750 to 3500 g/mol and having a content of 1,2-lateral vinyl double bonds of at least 40 mol %, based on all vinyl double bonds present in the polybutadiene,
- c2) from 5 to 20 wt. % styrene,
- c3) from 30 to 60 wt. % hydroxyethyl acrylate, hydroxyethyl methacrylate or mixtures thereof,
- c4) from 0 to 15 wt. % of one or more compounds from the group consisting of isobornyl acrylate, isobornyl methacrylate, cyclohexyl (meth)acrylate, 3,5,5-trimethylcyclohexyl (meth)acrylate and 4-tert.-butylcyclohexyl (meth)acrylate,
- c5) from 25 to 45 wt. % of one or more esters of acrylic or methacrylic acid and aliphatic $C_1$ to $C_4$ monoalcohols,
- c6) from 0.3 to 2 wt. % acrylic acid, methacrylic acid or mixtures thereof, and
- c7) from 0 to 15 wt. % of one or more compounds from the group consisting of hydroxypropyl (meth)acrylate, vinyl esters of aliphatic, optionally branched Cr to Cg-monocarboxylic acids, dialkyl or di(cyclo)alkyl esters of maleic or fumaric acid and $C_3$ to $C_6$ monoalcohols;

the amounts of c1) to c7) totaling 100 wt. %.

6. A coating composition according to claim 5, wherein the copolymers used in c) have a non-homogeneity (Mw/Mn) $\leq 2.5$.

7. A coating composition according to claim 5, wherein polyol component A) is prepared by polymerization of the corresponding monomers of the copolymer c) in the presence of the aliphatic oligocarbonate polyols a) and/or of the aliphatic oligoester polyols b).

8. A coating composition according to claim 1, wherein component B) comprises polyisocyanates or polyisocyanate mixtures having an isocyanurate structure based on HDI, IPDI and/or 4,4'-diisocyanato-dicyclohexylmethane.

9. A coating composition according to claim 1, wherein the NCO/OH ratio of the free and optionally blocked NCO groups to the isocyanate-reactive groups is from 0.5 to 1.2.

10. A coating obtained using the coating composition according to claim 1.

11. A substrate coated with a coating according to claim 10.

* * * * *